United States Patent
Li et al.

(10) Patent No.: US 8,532,929 B2
(45) Date of Patent: Sep. 10, 2013

(54) METHOD AND APPARATUS TO INCORPORATE INTERNAL GRADIENT AND RESTRICTED DIFFUSION IN NMR INVERSION

(75) Inventors: Lilong Li, Humble, TX (US); Songhua Chen, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 305 days.

(21) Appl. No.: 12/960,062

(22) Filed: Dec. 3, 2010

(65) Prior Publication Data

US 2011/0137567 A1    Jun. 9, 2011

Related U.S. Application Data

(60) Provisional application No. 61/267,232, filed on Dec. 7, 2009.

(51) Int. Cl.
*G06F 19/00* (2011.01)
*G01V 3/00* (2006.01)

(52) U.S. Cl.
USPC ............................................. 702/8; 324/303

(58) Field of Classification Search
USPC ................................ 702/8, 7, 6; 324/303, 314
See application file for complete search history.

(56) References Cited

U.S. PATENT DOCUMENTS

| | | | |
|---|---|---|---|
| 5,055,787 A | 10/1991 | Kleinberg et al. | |
| 5,387,865 A | 2/1995 | Jerosch-Herold et al. | |
| 5,698,979 A | 12/1997 | Taicher et al. | |
| 6,348,792 B1 | 2/2002 | Beard et al. | |
| 6,429,654 B1 | 8/2002 | Itskovich et al. | |
| 6,466,013 B1 | 10/2002 | Hawkes et al. | |
| 6,833,698 B2 | 12/2004 | Sun et al. | |
| 2008/0206887 A1 | 8/2008 | Chen et al. | |
| 2009/0210159 A1* | 8/2009 | Chen ................................ | 702/6 |

* cited by examiner

*Primary Examiner* — Bryan Bui
(74) *Attorney, Agent, or Firm* — Mossman Kumar & Tyler PC (57) ABSTRACT

Pulse sequences are applied to a fluid in an earth formation with an external static magnetic field and NMR spin echo signals are obtained. The received NMR signals are affected by internal field gradients due to a contrast in magnetic susceptibility between the grains of the formation matrix and the fluid in the pore space. Processing of the data gives the relaxation time and diffusivity of the fluid.

16 Claims, 6 Drawing Sheets

METHOD AND APPARATUS TO INCORPORATE INTERNAL GRADIENT AND RESTRICTED DIFFUSION IN NMR INVERSION

CROSS-REFERENCES TO RELATED APPLICATIONS

This application claims priority from U.S. provisional patent application 61/267,232 filed on Dec. 7, 2009.

FIELD OF THE DISCLOSURE

This disclosure relates to apparatus and techniques for making nuclear magnetic resonance (NMR) measurements in boreholes and to methods for determining nuclear magnetic characteristics of formations traversed by a borehole. Specifically, the disclosure relates to designing an accurate NMR measurement technique which is aimed at defining the diffusion properties of the fluid in the pore matrix in the presence of internal magnetic field gradients and restricted diffusion.

BACKGROUND OF THE DISCLOSURE

A variety of techniques have been used in determining the presence and in estimating quantities of hydrocarbons (oil and gas) in earth formations. These methods are designed to determine parameters of interest, including among other things, porosity, fluid content, and permeability of the earth formation surrounding a borehole drilled for recovering hydrocarbons. Typically, the tools designed to provide the desired information are used to log the borehole. Much of the logging is done after the borehole has been drilled. More recently, boreholes have been logged while drilling of the boreholes. This is referred to as measurement-while-drilling ("MWD") or logging-while-drilling ("LWD"). Measurements have also been made when tripping a drillstring out of a borehole: this is called measurement-while-tripping ("MWT").

The problem of diffusive motion under constraints of pore boundaries has many implications in a wide range of fields including biology, medicine, environmental science and the energy industry. NMR is an ideal candidate to study such a problem, but at high fields, the internal gradient due to magnetic susceptibility contrast becomes an important issue. In the case of sedimentary rocks, even low magnetic fields can generate a strong internal gradient that obscures the gradient of the external field. Numerous experimental studies as well as numerical calculations have been made to address this issue. For example, since the internal gradient is mainly produced by paramagnetic ions, paramagnetic doping and the effects of the density of paramagnetic ions have been studied. In addition, the distribution of internal gradients has been measured in sedimentary rocks. On the numerical side, the relaxation behavior has been calculated under various internal gradient and spatial restriction profiles. These studies on the one hand provide insight into the internal gradients present in porous materials, and on the other hand give an exact description of the relaxation behavior with ideal models. Practical issues, however, are often left unsolved due to the complexity of the natural pore space and the variation of the distribution of paramagnetic materials.

In this disclosure, it is shown that the complexity of the natural pore space and the variation in the distribution of paramagnetic materials can be simplified depending on the specific situation. One of the issues of particular interest is the Diffusion-$T_2$ (D-$T_2$) cross plot for fluid typing, which is used widely in well logging applications in the oil industry. It is easily postulated that the internal gradient effect causes an overestimate of diffusivity, but since modern logging tools employ multiple frequencies and associated gradients, and numerous sets of acquisition parameters, the exact influence of the internal gradient with restricted diffusion effect is unknown. A free diffusion equation with no regard to internal gradient is still generally used for data interpretation. The present disclosure uses a method that can incorporate internal gradient and restricted diffusion effects into the data inversion process. The simple model and associated calculation method discussed herein in detail constitute one embodiment of such a method.

SUMMARY OF THE DISCLOSURE

One embodiment of the disclosure is a method of evaluating an earth formation. The method includes: conveying a logging tool into a borehole; using a magnet on the logging tool for applying a magnetic field to polarize nuclei in a pore space of a region of examination in the earth formation, the applied magnetic field generating an internal magnetic field gradient in the pore spaces; applying a radio frequency (RF) field to excite the nuclei; receiving nuclear magnetic resonance (NMR) signals from the excited nuclei; and estimating an intrinsic transverse relaxation time of the nuclei and a diffusion property of a fluid containing the nuclei using the received NMR signals and a model in which a measured relaxation rate is defined as a function of a diffusivity, the intrinsic transverse relaxation time, and a magnetic susceptibility contrast between a fluid in the pore spaces and a material of a matrix of the earth formation.

Another embodiment of the disclosure is an apparatus configured to evaluate an earth formation. The apparatus includes: a logging tool configured to be conveyed into a borehole; a magnet on the logging tool configured to apply a magnetic field to polarize nuclei in a pore space of a region of examination in the earth formation, the applied magnetic field generating an internal magnetic field gradient in the pore spaces an antenna on the logging tool configured to apply a radio frequency field and excite the nuclei; an antenna on the logging tool configured to receive nuclear magnetic resonance (NMR) signals from the excited nuclei; and a processor configured to estimate an intrinsic transverse relaxation time of the nuclei and a diffusion property of a fluid containing the nuclei using the received NMR signals and a model in which a measured relaxation rate is defined as a function of a diffusivity, the intrinsic transverse relaxation time, and a magnetic susceptibility contrast between a fluid in the pore spaces and a material of a matrix of the earth formation.

Another embodiment of the disclosure is a tangible computer-readable medium product having stored thereon instructions that when read by a processor enable the processor to execute a method. The method includes: using nuclear magnetic resonance (NMR) signals from excited nuclei in a pore space of an earth formation and a model in which a measured relaxation rate is defined as a function of a diffusivity, and intrinsic transverse relaxation time, and a magnetic susceptibility contrast between a fluid in the pore spaces and a material of a matrix of the earth formation, wherein the excitation of the nuclei is a result of application of a radio-frequency magnetic field to the nuclei following polarization of the nuclei by application of a static magnetic field; and wherein the applied static magnetic field further generates an internal magnetic field gradient in the pore space.

BRIEF DESCRIPTION OF THE DRAWINGS

The present disclosure is best understood with reference to the following figures in which like numerals refer to like elements, and in which.

DETAILED DESCRIPTION

Figure 1:
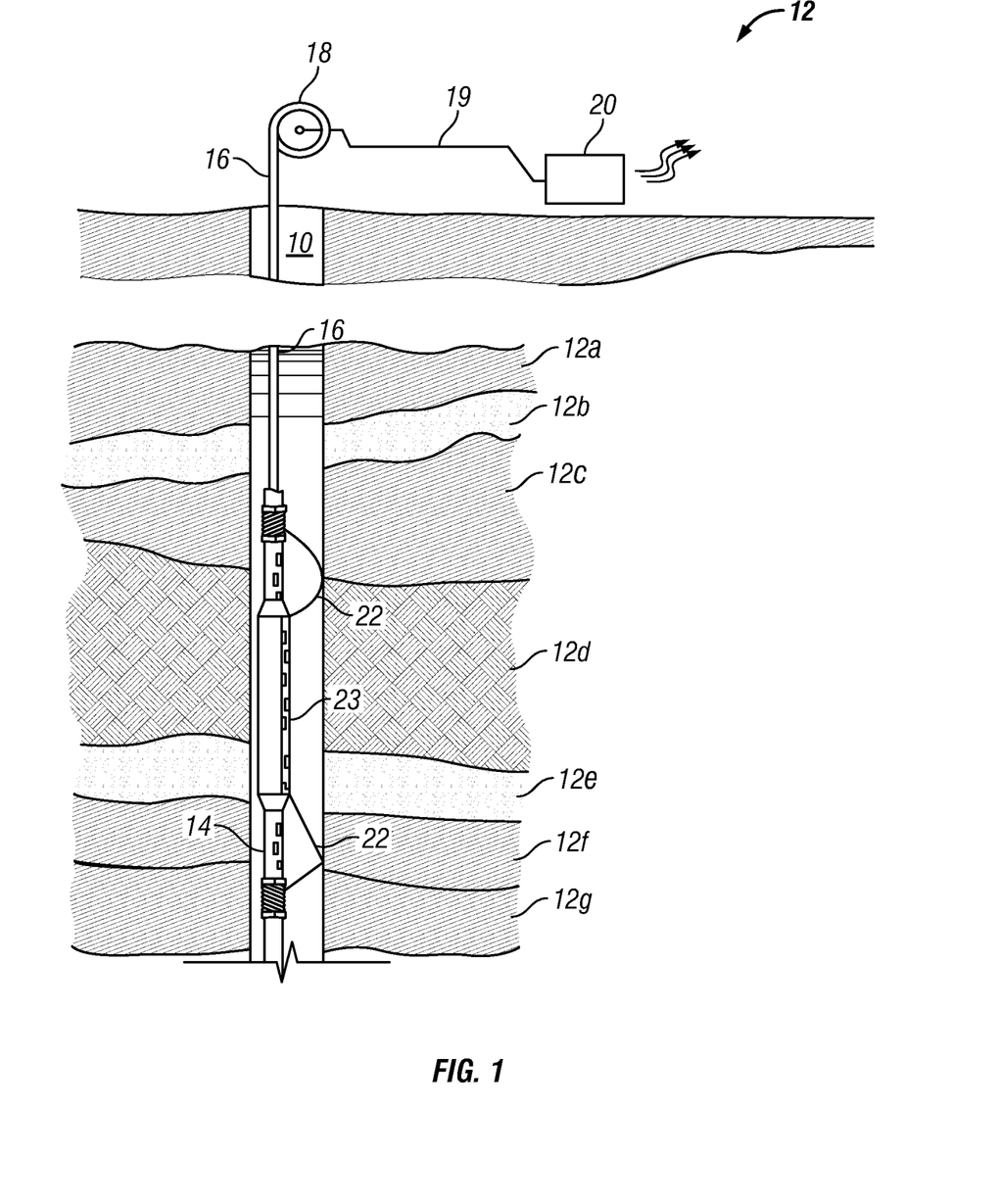
FIG. 1 depicts diagrammatically an NMR logging tool in a borehole.

FIG. 1 depicts a borehole 10 drilled in a typical fashion into a subsurface geological formation 12 to be investigated for potential hydrocarbon producing reservoirs. An NMR logging tool 14 has been lowered into the hole 10 by means of a cable 16 and appropriate surface equipment (represented diagrammatically by a reel 18) and is being raised through the formation 12 comprising a plurality of layers 12a through 12g of differing composition, to log one or more of the formation's characteristics. The NMR logging tool may be provided with bowsprings 22 to maintain the tool in an eccentric position within the borehole with one side of the tool in proximity to the borehole wall. Permanent magnets 23 may be used to provide a static magnetic field. Signals generated by the tool 14 are passed to the surface through the cable 16 and from the cable 16 through another line 19 to appropriate surface equipment 20 for processing, recording, display and/or for transmission to another site for processing, recording and/or display. Alternatively, the processor may be located at a suitable position (not shown) downhole, e.g., in the logging tool 14.

Figure 2:
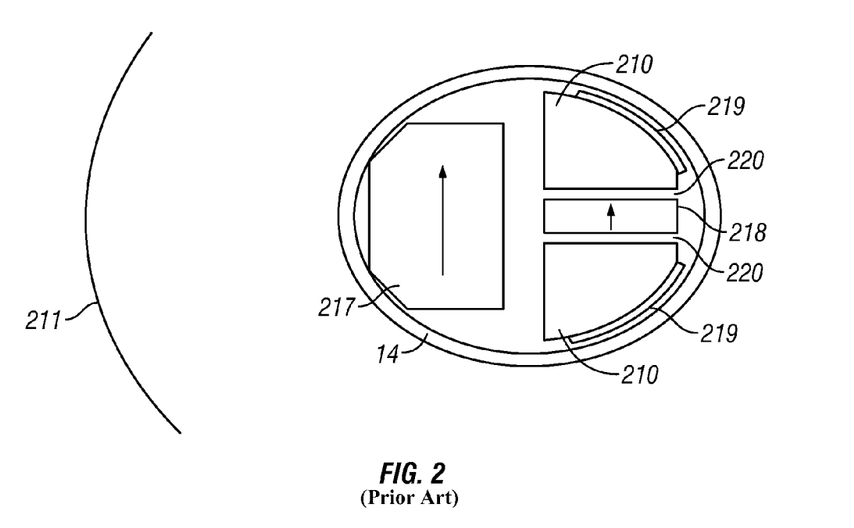
FIG. 2 (prior art) shows an exemplary configuration of magnets, antenna and shield suitable for use with the present disclosure.

FIG. 2 (prior art) schematically illustrates an exemplary embodiment of an apparatus suitable for use with the method of the present disclosure. This is discussed in detail in U.S. Pat. No. 6,348,792 of Beard et al., having the same assignee as the present disclosure and the contents of which are fully incorporated herein by reference. The tool cross-sectional view in FIG. 2 illustrates a main magnet 217, a secondary magnet 218 and a transceiver antenna comprising wires 219 and core material 210. The arrows depict the polarization (e.g., from the South pole to the North pole) of the main magnet 217 and the secondary magnet 218. A noteworthy feature of the arrangement shown in FIG. 2 is that the polarization of the magnets providing the static field is towards the side of the tool, rather than towards the front of the tool (the right side of FIG. 2).

The secondary magnet 218 is positioned to augment the shape of the static magnetic field by adding a second magnetic dipole in close proximity to an RF dipole defined by the wires 219 and the soft magnetic core 210. This positioning moves the center of the effective static dipole closer to the RF dipole, thereby increasing the azimuthal extent of the region of examination. The secondary magnet 218 also reduces the shunting effect of the high permeability magnetic core 210 on the main magnet 217. In the absence of the secondary magnet, the DC field would be effectively shorted by the core 210. Thus, the secondary magnet, besides acting as a shaping magnet for shaping the static field to the front of the tool (the side of the main magnet) also acts as a bucking magnet with respect to the static field in the core 210. Those versed in the art will recognize that the bucking function and a limited shaping may be accomplished simply by having a gap 220 in the core; however, since some kind of field shaping is desired on the front side of the tool, in one embodiment of the disclosure, the secondary magnet serves both for field shaping and for bucking. If the static field in the core 210 is close to zero, then the magnetostrictive ringing from the core is substantially eliminated. A static shield 211 may be used to reduce the RF field behind the tool.

Within the region of investigation, the static field gradient is substantially uniform and the static field strength lies within predetermined limits to give a substantially uniform Larmor frequency. Those versed in the art will recognize that the combination of field shaping and bucking may be accomplished by other magnet configurations than those shown in FIG. 2.

For NMR logging, nuclear spins are polarized by a static magnetic field. Following this, a radio-frequency (RF) pulse sequence is applied. The most common sequence is the Carr-Purcell-Meiboom-Gill ("CPMG") sequence that can be expressed as $$TW-90-(\tau-180-\tau-echo)_n$$

where TW is a wait time, 90 is a 90° tipping pulse, 180 is a 180° refocusing pulse and 2τ=TE is the interecho spacing.

After being tipped by 90°, the magnetic moment of a nuclear spin precesses around the static field at a particular frequency known as the Larmor frequency ω, given by $\omega=\gamma B_0$, where $B_0$ is the field strength of the static magnetic field and γ is the gyromagnetic ratio. At the same time, the magnetic moments return to the equilibrium direction (i.e., align with the static field) according to a decay time known as the "spin-lattice relaxation time" or $T_1$. Inhomogeneities of the $B_0$ field result in dephasing of the magnetic moments. To remedy this, a 180° pulse is included in the sequence to refocus the magnetic moments. This refocusing gives a sequence of n echo signals. These echo sequences are then processed to provide information about the relaxation times.

U.S. Pat. No. 6,466,013 to Hawkes et al. and U.S. Pat. No. 6,429,654 to Itskovich et al., both having the same assignee as the present disclosure, teach the use of modified CPMG pulse sequences with reduced power requirements in which the refocusing pulse angle may be less than 180°. These modified pulse sequences may be referred to as optimal rephasing pulse sequences (ORPS), and denoted by: TW-A-(τ-B-τ-echo)$_n$ where A is a tipping pulse and B is a refocusing pulse. It is to be noted that several so-called diffusion editing sequences have been used in prior art. All of these include some variation of the CPM G sequence.

NMR spin echo signals may be obtained using the apparatus of FIG. 2. Optionally, additional measurements may be made using an external gradient field as discussed in Reiderman, (U.S. Pat. No. 5,698,979) having the same assignee as the present disclosure and the contents of which are incorporated herein by reference. Measurements made with the gradient field enable the determination of diffusivity. The manner in which these measurements are used is discussed next.

The guiding equation for magnetization evolution with a field gradient is $$\left(\frac{\partial}{\partial t} - D\nabla^2 + i\gamma g \cdot r\right)m(r, t) = 0 \quad (1)$$

where $\nabla^2$ is the Laplace operator, D is the diffusion coefficient, $\gamma$ is the gyromagnetic ratio, and m is the magnetic moment. This equation was proposed by Torrey (1956) by modifying the Bloch equation to account for the diffusive motion. Under geometrical confinement, the proper boundary condition is:

$$D\frac{\partial}{\partial n}m(r, t) + \rho m(r, t) = 0 \quad (2)$$

where a $\partial/\partial n$ is the outward normal derivative and $\rho$ is the surface relaxivity.

In one embodiment of the disclosure, Eqn. 1 is solved by a finite difference method. In another embodiment of the disclosure, Eqn. 1 is solved by multiple correlation function approach developed by Grebenkov. In yet another embodiment, a Monte Carlo technique is used to simulate the Brownian motion of individual spins. The phase accumulation of an individual spin n is equal to:

$$\varphi_n(t) = \gamma \int_0^t B(z_n(\tau))d\tau \quad (3)$$

Here $z_n$ is used instead of $r_n$ because only the gradient in the direction of the main magnetic field is considered. Assuming that at time t=0, all the spins align in the transverse plane, at time t, the total magnetization is $$M = M_0 \langle \exp(i\varphi) \rangle = \frac{1}{N}\sum_{n=1}^{N}\exp(i\varphi_n) \quad (4)$$

where N is the total number of spins simulated.

When diffusion is restricted between parallel planes (i.e., a 1D slab), one embodiment of the disclosure uses the following model for the internal field:

$$B_z^i = \delta_\chi B_0 \sin\left(\frac{\pi r}{L}\right) \quad 0 \le r \le L \quad (5)$$

where L is the length between the two parallel planes. In the case of spherical boundaries (i.e., a 3D sphere), The embodiment uses the following internal field distribution along z direction:

$$B_z^s = \delta_\chi B_0 \cos\left(\frac{\pi r}{2R}\right)\cdot\cos(\theta) \quad 0 \le r \le R, 0 \le \theta \le \pi \quad (6)$$

These two models are based on the criteria that the maximum of the internal field is proportional to $\delta_\chi B_0$, that the field gradient is normally higher at the liquid-solid interface, and that the profile of the internal field does not change with the size of the grains. The finite difference method follows the Crank-Nicholson procedure and is not repeated here.

The multiple correlation function (MCF) approach is explained in detail in Grebenkov. As discussed therein, the problem of restricted diffusion under an arbitrary magnetic field is reformulated in terms of multiple correlation functions of the reflected Brownian motion. The moments of the random phase accumulated by a diffusing spin are found in a matrix form involving the Laplace operator eigenbasis in a confining domain. The spatial inhomogeneities and time dependence of the magnetic field enter the multiple correlation functions as functionals and weight factors. Grebenkov asserts that:

In many systems, differences in the magnetic susceptibility between the solid matrix and the fluid substance induce high internal magnetic fields near their frontier. These geometry-dependent fields are, in general, difficult to access and control. In this review, the susceptibility effects are supposed to be either neglected or effectively taken into account through the spatial profile of the magnetic field. Note that the last option would require elaborate models of internal magnetic fields.

In the present disclosure, it is shown that relatively simple models that include the magnetic susceptibility contrast give results that are similar to those obtained using the MCF approach.

In the case of 1D calculation, Eq. 5 was used as internal field model. The eigenvalues of the Laplace operator are:

$$\lambda_m = \alpha_m^2 \quad \alpha_m = 0, \pi, 2\pi, 3\pi, \ldots \quad (7)$$

The eigienfunctions are $$u_m(x) = \sqrt{2}\beta_m \cos(\alpha_m x) \quad 0 \le x \le 1, \beta_m = 1/\sqrt{2}, 1, 1, 1, \ldots \quad (8)$$

In the case of 3D spherical boundaries outlined in Eq. 6, the eigenvalues of the Laplace operator are $$\lambda_{nk} = \alpha_{nk}^2 \quad (9)$$

where $\alpha_{nk}$ is the solution to $\alpha_{nk}j_n'(\alpha_{nk})=0$ and $j_n(z)$ is the spherical Bessel function. The eigenfuctions are $$u_{nkl}(r, \theta, \varphi) = \frac{\beta_{nk}}{\sqrt{2\pi}}\frac{j_n(\alpha_{nk}r)}{j_n(\alpha_{nk})}P_n(\cos\theta)e^{il\varphi} \quad (10)$$

$$0 \le r \le 1, 0 \le \theta \le \pi, 0 \le \varphi \le 2\pi$$

where $P_n(x)$ are the Legendre polynomials and $\beta_{nk}$ is defined by $$\beta_{nk} = \left(\frac{(2n+1)\lambda_{nk}}{\lambda_{nk} - n(n+1)}\right)^{1/2} \quad (\beta_{00} \to \sqrt{3/2}) \quad (11)$$

In practical implementation, $\lambda_{nk}$ has to be sorted in ascending order to use a single index m. The index l is not important here because the internal field does not depend on $\phi$ and the integral over $\phi$ simply gives a factor $2\pi$. The final amplitude of the signal is $$E \cong \left(\prod_{k=0}^{K}\exp\left\{-\frac{1}{K}[\rho\Lambda + iqfB]\right\}\right)_{0,0} \quad (12)$$

where K is a large number that divides measurement time interval TE, $p=D\cdot TE/L^2$, $q=\gamma\cdot TE\cdot L$, $f=\pm 1$ and changes sign wherever there is a 180° refocusing pulse, $\Lambda_{m,m'} = \delta_{m,m'}\lambda_{m'}$ and B is a matrix with elements being $$B_{m,n} = \int_\Omega dr u_m^*(r) B_z(r) u_n(r) \qquad (13)$$

A random pack of 10,000 equal spheres was used to represent the internal field contribution to a single pore in the middle of the grain pack. The magnetic dipole moment of each sphere is $$M \approx \frac{4}{3}\pi R^3 \delta_\chi B_0 / \mu_0 \qquad (14)$$

Where R is the radius of the sphere $\delta_\chi$ is the difference in magnetic susceptibility between the grain material and the fluid, $B_0$ is the external magnetic field, and $\mu_0$ is the permeability of free space. The magnetic field at position r due to the contribution of the ith sphere is:

$$B^i(r) = \frac{\mu_0}{4\pi} \cdot \frac{3(M \cdot \delta r^i)\delta r^i - |\delta r^i|^2 M}{|\delta r^i|^5} \qquad (15)$$

where $\delta r^i = r - r^i$ is the vector from sphere position $r^i$ to r. If we only consider B(r) in z direction and assume that $B_0$ lies along z direction.

$$B_z^i(r) = \frac{3(\delta z^i/|\delta r^i|)^2 - 1}{3} \cdot \left(\frac{R}{|\delta r^i|}\right)^3 \cdot \delta_\chi B_0 \qquad (16)$$

Summing $B_z(r)$ over 10,000 spheres surrounding the pore determines the internal field at any position r in the pore.

For the random-walk simulation, to avoid the summation at each step of the random walk, the simulation is done on a discrete grid. The pore is divided into a roughly 100×100×100 grid. The mean squared displacement $\langle R^2 \rangle$ of a random walk on a three dimensional grid is:

$$\langle R^2 \rangle = nl^2 \qquad (17)$$

Where n is the number of steps and l is the length of each unit in the grid. At the same time, the mean squared displacement of Brownian motion is given by $$\langle R^2 \rangle = 2dDt \qquad (18)$$

Where d is the number of dimensions. From Eq. 17 and Eq. 18, the time lapse between each movement of a walker has to be:

$$\delta \tau = \frac{l^2}{2dD} \qquad (19)$$

Data were simulated for the values of magnetic susceptibility contrast between the grain and the fluid $\Delta_\chi$ equal to 0, 0.0001 and 0.0002, and r, a representative pore size equal to 1 µm, 3 µm, 10 µm and 30 µm. The surface relaxivity ρ was set as 10 µm/s, and the relationship between pore size and surface relaxation is assumed to be:

$$T_{2S} = \rho \frac{S}{V}. \qquad (20)$$

The simulated data were then inverted using only a free diffusion model. The results are plotted in FIG. 3 in rows (a)-(c) in which (a) $\Delta_\chi = 0$, (b) $\Delta_\chi = 0.0001$, (c) $\Delta_\chi = 0.0002$ and in columns (1)-(4) in which (1) r=1 µm, (2) r=3 µm, (3) r=10 µm, (4) r=30 µm. In each plot, the abscissa is the $T_2$ and the ordinate is the diffusivity.

It can be seen that internal gradient has a substantial influence on fluid-typing measurements, especially when the magnetic susceptibility contrast is high (not uncommon in the case of sedimentary rocks where a significant amount of paramagnetic materials may be present). With the surface relaxivity parameter set to 10 µm/s, the maximum internal gradient effect corresponds to a pore size of 5-10 µm. This corresponds to columns 2 and 3 in FIG. 3. For smaller (col. 1) and larger (col. 4) pores, the motional averaging and slow diffusion regimes are respectively approached and the internal gradient effects are much weaker. In the case where internal gradient does not exist ($\Delta_\chi=0$, row a), as pore sizes progressively becomes smaller, the diffusivity that comes from inversion deviates further from an input number, suggesting ever stronger effects from restricted diffusion.

Figure 3:
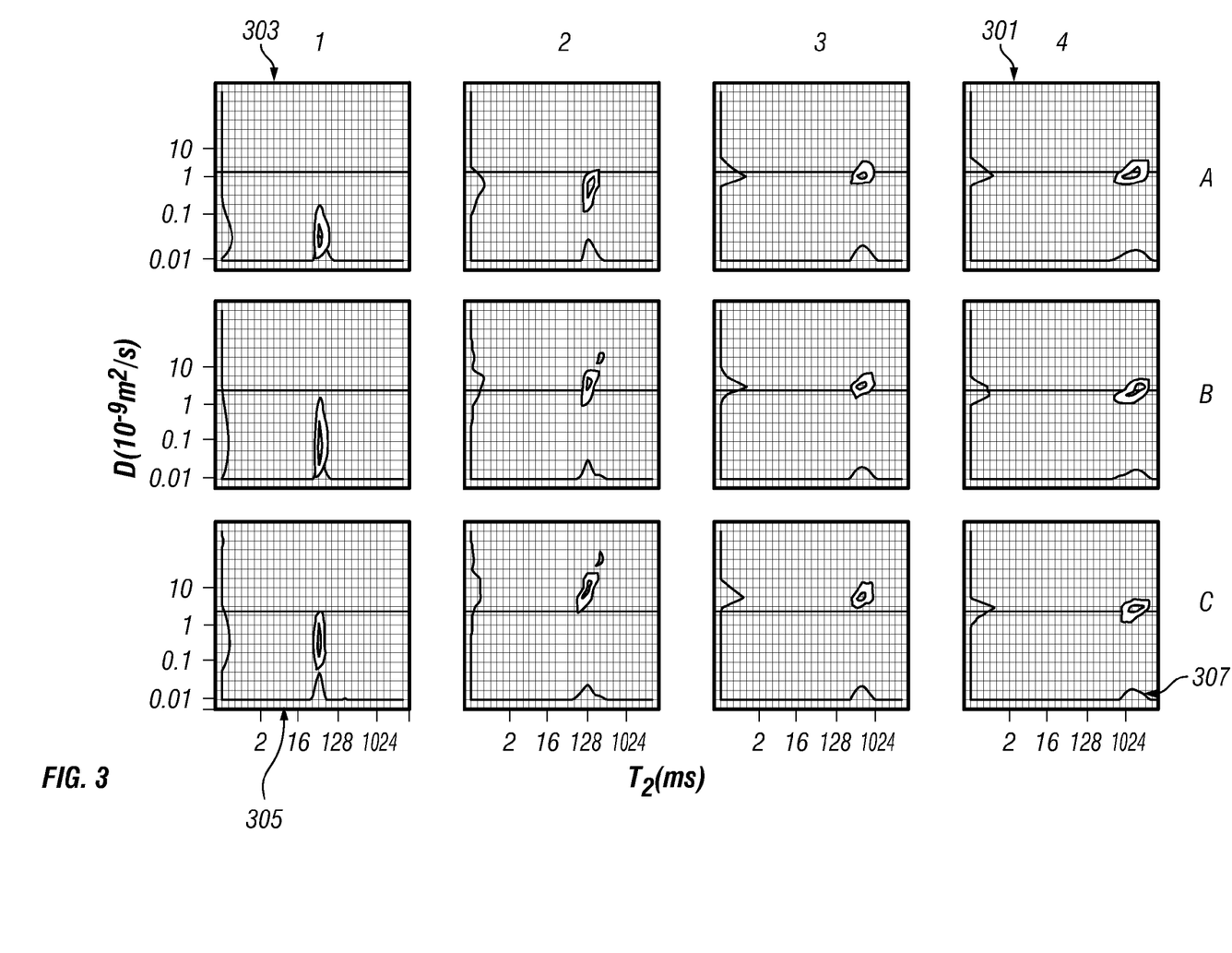
FIG. 3 shows inversion results using only free diffusion for simulated data including free diffusion and internal gradients in rows (a) $\Delta_\chi=0$, (b) $\Delta_\chi=0.0001$, (c) $\Delta_\chi=0.0002$ and columns (1) r=1 μm, (2) r=3 μm, (3) r=10 μm, (4) r=30 μm.

Also plotted in the individual FIGS. 3(a)(1)-3(c)(4) are results of 1-D inversion. It can be seen that the 1-D inversion for diffusivity is close to the correct value 301 for the largest pore size (col. 4) corresponding to the slow diffusion limit, but not for the smallest pore size (col. 1), 303. In contrast, the 1-D inversion for $T_2$ is good 305 for the smallest pore size, corresponding to motional averaging but not well resolved 307 for the largest pore size.

The present disclosure includes a modification to the free diffusion model. The free diffusion model uses a rate of relaxation $$\frac{1}{T_2} = \frac{1}{T_{2S}} + \frac{1}{12}D(\gamma g \cdot TE)^2, \qquad (21)$$

where $1/T_{2S}$ is the rate of relaxation due to contact with the solid surface. With restricted diffusion and a complex distribution of internal gradient, such an analytical formula does not exist. Fortunately, for the inversion problem, a numerical solution still exists because of the discrete nature of the inversion algorithm. One can write the measured rate of relaxation in this case as a function of various variables, $$R_{i,j,k,l,m,n} = R(D_i, T_{2j}, \rho_k, r_{(j,k)}, \chi_l, B_m, g_m, TE_n) \qquad (22)$$

where $B_m$ and $g_m$ are the magnetic field and its gradient generated by the tool, $TE_n$ represents one instance of TE as configured in the pulse sequence, $\rho_k$ and $\chi_l$ are possible numbers for surface relaxivity and magnetic susceptibility, respectively, and $D_i$ and $T_{2j}$ represent one point in the 2D inversion grid. Here, $T_{2j}$ is an inherent transverse relaxation rate. The inversion grid is defined with coordinates D and $T_2$. As all variables take discrete numbers, the possible values of R become a huge matrix. Such matrix is still manageable and can be numerically computed and stored ahead of the time. At the time of inversion, the matrix values can be fetched with minimal delay. This is a table lookup of recalculated data.

Figure 4:
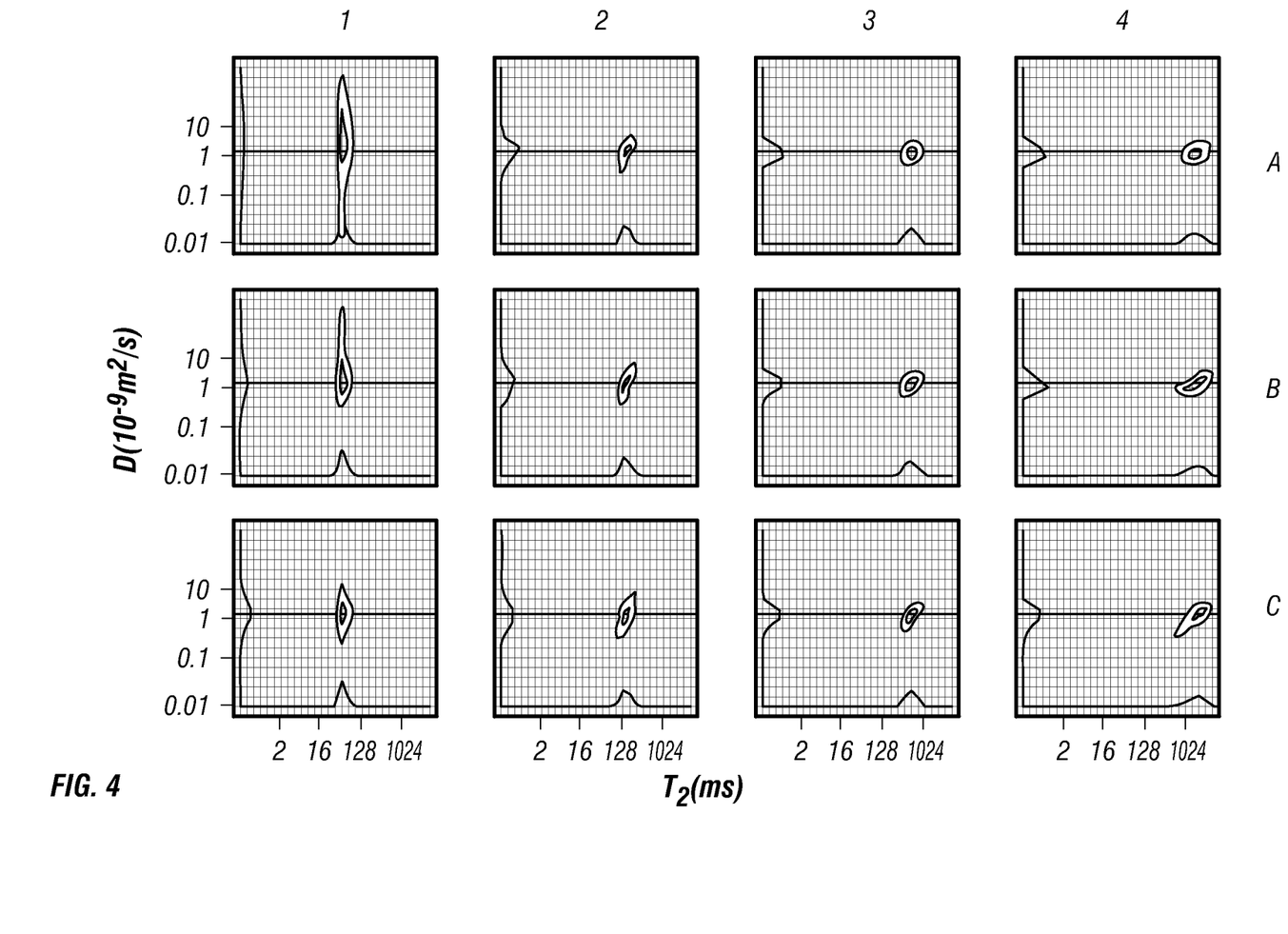
FIG. 4 shows inversion results using free diffusion and internal field gradients for simulated data including free diffusion and internal gradients in rows (a) $\Delta_\chi=0$, (b) $\Delta_\chi=0.0001$, (c) $\Delta_\chi=0.0002$ and columns (1) r=1 μm, (2) r=3 μm, (3) r=10 μm, (4) r=30 μm.

With such discretization in mind, we substituted the real time calculation according to Eq. 21 with fetched data according to Eq. 22 in the inversion process. The result is shown in FIG. 4. FIG. 4 shows inversion results using free diffusion and internal field gradients for simulated data including free diffusion and internal gradients shown in rows (a) $\Delta_\chi=0$, (b) $\Delta_\chi=0.0001$, (c) $\Delta_\chi=0.0002$. As in FIG. 3, the columns of FIG. 4 are (1) r=1 µm, (2) r=3 µm, (3) r=10 µm, (4) r=30 µm; From FIG. 4, we see that for the synthetic data, the inversion result is significantly improved over the original method. The remaining difference between the inversion results and the original point data of input (in terms of T2 and D) is most probably due to discretization. Note that the 1-D projections of the inversion results have a peak near the correct value for all grain sizes and all magnetic permeability contrasts.

Those skilled in the art and having benefit of the present disclosure would recognize that a suitable model for internal field distribution has to be developed. In principle, a pore scale model of sedimentary rock may be used to calculate the matrix in Eq. 22, but practically such calculation takes a huge amount of time. To save time, one embodiment of the disclosure uses a simplified model for the matrix calculation. This simplified model is based on Eq. 6 and can be used in such a way to statistically represent the internal field in a rock.

A random walk in a single pore in the middle of a sphere pack is used to calculate the $T_2$ decay and compared with that with Multiple Correlation Function (MCF) calculation from the simple model described above. FIG. 5 shows the comparison. 1D random walk was also performed with the same field distribution as in the MCF calculation to test the accuracy of the random walk calculations. Plotted are values of the relaxation of the initial magnetization as a function of time.

Figure 5A:
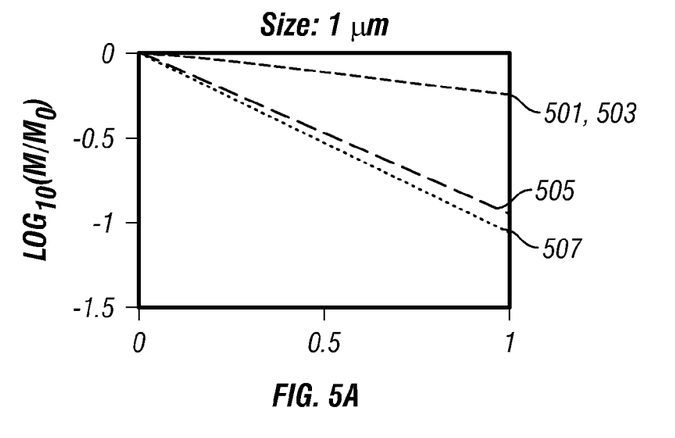
FIGS. 5(a)-(e) show comparisons of relaxation simulations for a 1-D multiple correlation function (MCF), a 1-D random walk, a spherical MCF and a pore random walk for pore a size of (a) 1 μm, (b) 3 μm, (c) 10 μm, (d) 30 μm and (e) 100 μm.
Figure 5B:
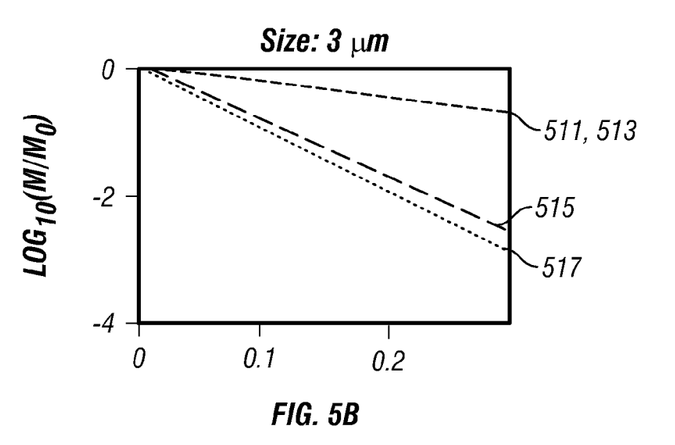
Figure 5C:
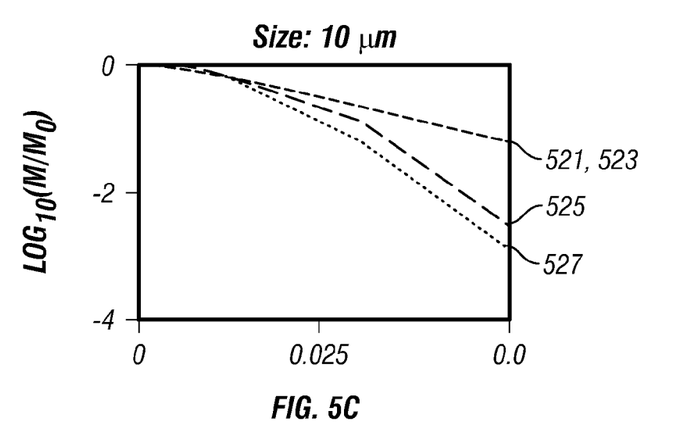
Figure 5D:
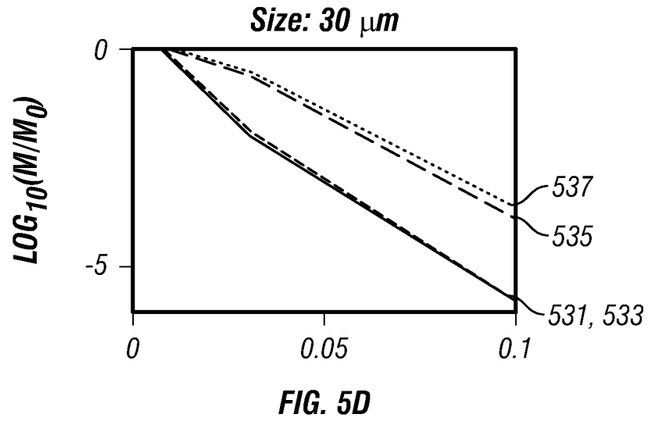
Figure 5E:
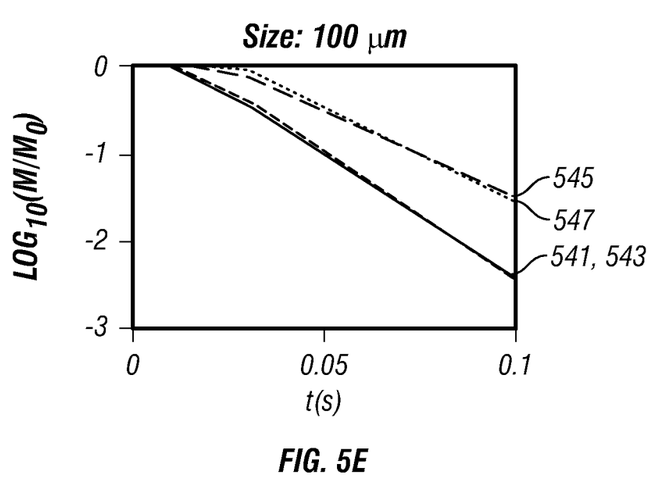

As shown in FIGS. 5(a)-(c), the data points for the 1-D MCF and the 1-D random walk (RW) (501, 503), (511, 513), (521, 523), (531, 533) and (541, 543) look identical, which suggests that the random walk procedure is reliable. We can see a difference between the 3 D simple model calculation with MCF and 3D random work results in a single pore, (505, 507), (515, 517), (525, 527), (535, 537) and (545, 547), but the difference is not that significant in terms of real applications. Furthermore, we believe that the profiles of internal gradient in different pores are similar statistically. Thus we conclude that the 3D simple model, instead of a complex pore scale model, together with the MCF approach to solve such a model, is physically sound and may be used for the inversion process.

Because the Block-Torrey equation does not have an analytical solution, and also because the shape of the pore system in a sedimentary rock and the distribution of the internal field within the pore system are so complicated, prior art does not disclose a good way to handle internal gradient effect in the $D-T_2$ inversion problem. In the present disclosure, it is shown that a work flow can be developed to incorporate the internal gradient and restricted diffusion effects. In one embodiment, a simple model for the pore and the internal gradient distribution is used. The model may not perfectly represent the real pore system in a rock, but it captures the most important features of an internal gradient and can statistically represent the internal field distribution. A simple model instead of real pore scale rock models is used here because in order to incorporate internal gradient effect, MCF calculations on the simple model instead of Monte Carlo simulations may be used which results in tremendous time-savings. By taking advantage of the discrete nature of the inversion algorithm, an MCF calculation can generate the set of matrices that may be used in the inversion process, thus avoiding the need for analytical solutions. By incorporating the internal gradient effect this way in the inversion process, it is demonstrated that drastic improvements may be achieved compared to traditional free diffusion interpretation method when internal gradient effect is significant. In other embodiments, real rock models with the Monte Carlo simulation can be used to generate the relaxation matrix, when computation time is not a major concern.

The results of the processing may be used to estimate properties of interest such as a $T_2$ distribution, volumetrics, permeability, echo trains, bound volume irreducible, effective porosity, bound water, clay-bound water, total porosity, pore size distribution, and other rock and fluid properties that are based on NMR data. These are all used in reservoir evaluation and development. The term "volumetrics" is intended to include porosity, porosity partitions, porosity associated with individual fluid types. It is also possible to estimate multiphase fluid saturation, and hydrocarbon volumes.

The model used by the processor may further be a function of a surface relaxivity, an intensity of the applied magnetic field, and a gradient of the applied magnetic field. The applying the RF magnetic field may further include using a pulse sequence of the form:

$$TW-A-(\tau-B-\tau-echo)_n$$

where TW is a wait time, A is a tipping pulse, B is a refocusing pulse and $2\tau=TE$ is the interecho spacing; and wherein the relaxation rate is also a function of TE. The processor may be further configured to use the estimated relaxation time of the nuclei and the estimated diffusion property of the fluid containing the nuclei to estimate at least one of: (i) $T_2$ distribution, (ii) volumetrics, (iii) a permeability, (iv) a bound volume irreducible, (v) effective porosity, (vi) bound water, (vii) clay-bound water and (viii) total porosity. The model used by the processor may further include performing a calculation on a 3-dimensional grid. The model used by the processor may further include using a contribution to the internal gradient from a specified number of grains. The apparatus may include a conveyance device configured to convey the logging tool into the borehole, the conveyance device being selected from (i) a wireline, and (ii) a drilling tubular. The processor may be further configured to implement the model as a random walk in a pore space.

Also described above is a computer-readable medium product having stored thereon instructions that when read by a processor enable the processor to execute a method. The method includes: using nuclear magnetic resonance (NMR) signals from excited nuclei in a pore space of an earth formation and a model in which a relaxation rate is defined as a function of a diffusivity, the transverse relaxation time, and a magnetic susceptibility contrast between a fluid in the pore spaces and a material of a matrix of the earth formation, wherein the excitation of the nuclei is a result of application of a radio-frequency magnetic field to the nuclei following polarization of the nuclei by application of a static magnetic field; and wherein the applied static magnetic field further generates an internal magnetic field gradient in the pore space.

The medium may be at least one of: (i) a ROM, (ii) an EPROM, (iii) an EAROM, (iv) a flash memory, and (v) an optical disk.

The method of the present disclosure is described above with reference to a wireline-conveyed NMR logging tool. The method may also be used on logging tools conveyed on a coiled tubing in near-horizontal boreholes. The method may also be used on NMR sensors conveyed on a drilling tubular, such as a drillstring or coiled tubing for Measurement-While-Drilling (MWD) applications. As is standard practice in well-logging, the results of the processing are recorded on a suitable medium. Implicit in the processing of the data is the use of a computer program implemented on a suitable machine-readable medium that enables the processor to perform the control and processing. The machine readable medium may include ROMs, EPROMs, EAROMs, Flash Memories and Optical disks.

While the foregoing disclosure is directed to the specific embodiments of the disclosure, various modifications will be apparent to those skilled in the art. It is intended that all variations within the scope and spirit of the appended claims be embraced by the foregoing disclosure.

What is claimed is:

1. A method of evaluating an earth formation, the method comprising:
   conveying a logging tool into a borehole;
   using a magnet on the logging tool for applying a magnetic field to polarize nuclei in a pore space of a region of examination in the earth formation, the applied magnetic field generating an internal magnetic field gradient in the pore spaces;
   applying a radio frequency (RF) field to excite the nuclei;
   receiving nuclear magnetic resonance (NMR) signals from the excited nuclei; and
   estimating an intrinsic transverse relaxation time of the nuclei and a diffusion property of a fluid containing the nuclei using the received NMR signals and a model in which a measured relaxation rate is defined as a function of a diffusivity, the intrinsic transverse relaxation time, and a magnetic susceptibility contrast between a fluid in the pore spaces and a material of a matrix of the earth formation.

2. The method of claim 1 wherein using the model further comprises at least one of: (i) a 1-D model, (ii) a 3-D spherical model, (iii) a 3-D model, and (iv) a Monte Carlo model.

3. The method of claim 1 wherein estimating the intrinsic transverse relaxation time of the nuclei and the diffusion property of the fluid further comprises a table lookup using precalculated values.

4. The method of claim 1 wherein the measured relaxation rate is further a function of a surface relaxivity, an intensity of the applied magnetic field, a gradient of the applied magnetic field, a pore size, a pore shape, and a distribution of the internal field.

5. The method of claim 1 wherein applying the RF magnetic field further comprises using a pulse sequence of the form:

$$TW-A-(\tau-B-\tau-echo)_n$$

where TW is a wait time, A is a tipping pulse, B is a refocusing pulse and $2\tau=TE$ is the interecho spacing; and wherein the relaxation rate is also a function of TE.

6. The method of claim 1 further comprising using the estimated intrinsic transverse relaxation time of the nuclei and the estimated diffusion property of the fluid containing the nuclei for estimating at least one of: (i) $T_2$ distribution, (ii) volumetrics, (iii) a permeability, (iv) a bound volume irreducible, (v) effective porosity, (vi) bound water, (vii) clay-bound water, (viii) total porosity (ix) multiphase fluid saturation, and (x) hydrocarbon volumes.

7. The method of claim 1 further comprising conveying the logging tool into the borehole on a conveyance device selected from (i) a wireline, and (ii) a drilling tubular.

8. An apparatus configured to evaluate an earth formation, the apparatus comprising:
   a logging tool configured to be conveyed into a borehole;
   a magnet on the logging tool configured to apply a magnetic field to polarize nuclei in a pore space of a region of examination in the earth formation, the applied magnetic field generating an internal magnetic field gradient in the pore spaces;
   an antenna on the logging tool configured to apply a radio frequency field and excite the nuclei;
   an antenna on the logging tool configured to receive nuclear magnetic resonance (NMR) signals from the excited nuclei; and
   a processor configured to estimate an intrinsic transverse relaxation time of the nuclei and a diffusion property of a fluid containing the nuclei using the received NMR signals and a model in which a measured relaxation rate is defined as a function of a diffusivity, the intrinsic transverse relaxation time, and a magnetic susceptibility contrast between a fluid in the pore spaces and a material of a matrix of the earth formation.

9. The apparatus of claim 8 wherein the processor is further configured to use the model by using at least one of (i) a 1-D model, (ii) a 3-D spherical model, (iii) a 3-D model, and (iv) a Monte Carlo model.

10. The apparatus of claim 8 wherein the processor is further configured to estimate the intrinsic transverse relaxation time of the nuclei and the diffusion property of the fluid further by performing a table lookup using precalculated values.

11. The apparatus of claim 8 wherein the measured relaxation rate in the model used by the processor is further a function of a surface relaxivity, an intensity of the applied magnetic field, a gradient of the applied magnetic field, a pore size, a pore shape, and a distribution of the internal field.

12. The apparatus of claim 8 wherein applying the RF magnetic field further comprises using a pulse sequence of the form:

$$TW-A-(\tau-B-\tau-echo)_n$$

where TW is a wait time, A is a tipping pulse, B is a refocusing pulse and $2\tau=TE$ is the interecho spacing; and wherein the relaxation rate is also a function of TE.

13. The apparatus of claim 8 wherein the processor is further configured to use the estimated intrinsic transverse relaxation time of the nuclei and the estimated diffusion property of the fluid containing the nuclei to estimate at least one of: (i) $T_2$ distribution, (ii) volumetrics, (iii) a permeability, (iv) a bound volume irreducible, (v) effective porosity, (vi) bound water, (vii) clay-bound water (viii) total porosity, (ix) a multiphase fluid saturation and (x) hydrocarbon volumes.

14. The apparatus of claim 8 further comprising a conveyance device configured to convey the logging tool into the borehole, the conveyance device being selected from (i) a wireline, and (ii) a drilling tubular.

15. A non-transitory computer-readable medium product having stored thereon instructions that when read by a processor enable the processor to execute a method, the method comprising:
   using nuclear magnetic resonance (NMR) signals from excited nuclei in a pore space of an earth formation and a model in which a measured relaxation rate is defined as a function of a diffusivity, and intrinsic transverse relaxation time, and a magnetic susceptibility contrast between a fluid in the pore spaces and a material of a matrix of the earth formation;
   wherein the excitation of the nuclei is a result of application of a radio-frequency magnetic field to the nuclei following polarization of the nuclei by application of a static magnetic field; and
   wherein the applied static magnetic field further generates an internal magnetic field gradient in the pore space.

16. The non-transitory computer-readable medium product of claim 15 further comprising at least one of: (i) a ROM, (ii) an EPROM, (iii) an EAROM, (iv) a flash memory, and (v) an optical disk.

* * * * *